US012345462B2

(12) United States Patent
Ishikawa

(10) Patent No.: US 12,345,462 B2
(45) Date of Patent: Jul. 1, 2025

(54) LOW-TEMPERATURE STORAGE SYSTEM

(71) Applicant: TSUBAKIMOTO CHAIN CO., Osaka (JP)

(72) Inventor: Koichi Ishikawa, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 106 days.

(21) Appl. No.: 18/209,777

(22) Filed: Jun. 14, 2023

(65) Prior Publication Data

US 2023/0417472 A1 Dec. 28, 2023

Related U.S. Application Data

(63) Continuation of application No. PCT/JP2021/033893, filed on Sep. 15, 2021.

(30) Foreign Application Priority Data

Dec. 17, 2020 (JP) .................................. 2020-209379

(51) Int. Cl.
*F25D 25/04* (2006.01)
*B01L 1/02* (2006.01)
(Continued)

(52) U.S. Cl.
CPC .............. *F25D 17/06* (2013.01); *B01L 1/025* (2013.01); *F25D 17/042* (2013.01); *F25D 25/04* (2013.01);
(Continued)

(58) Field of Classification Search
CPC ........ F25D 17/06; F25D 17/042; F25D 25/04; F25D 3/11; F25D 13/067; F25D 21/04; B01L 1/025; B01L 7/5255
See application file for complete search history.

(56) References Cited

U.S. PATENT DOCUMENTS 4,138,854 A * 2/1979 Schlemmer .......... A23B 2/8033
62/62
4,599,871 A * 7/1986 Fredrixon ............... F25D 13/04
62/378
(Continued)

FOREIGN PATENT DOCUMENTS

CN 107642938 A 1/2018
JP 2007255793 A 10/2007
(Continued)

OTHER PUBLICATIONS

International Search Report dated Nov. 30, 2021, issued in counterpart International Application No. PCT/JP2021/033893, with English Translation. (4 pages).
(Continued)

*Primary Examiner* — David J Teitelbaum
(74) *Attorney, Agent, or Firm* — WHDA, LLP

(57) ABSTRACT

An object of the present invention is to provide a low-temperature storage system that ensures minimal penetration of moisture into the low-temperature storage chamber from an external environment without involving an increase in size or complexity of the system configuration. The object is achieved by the configuration in this low-temperature storage system wherein a loading/unloading mechanism that carries storage objects into and out of the low-temperature storage chamber has an ancillary entry/exit preparation chamber. The entry/exit preparation chamber has a first anteroom with an interior space controlled to maintain a lower dew point than that of the external environment, and a second anteroom disposed between the first anteroom and the low-temperature storage chamber and having an interior space controlled to maintain a dew point that is between the dew point in the first anteroom and the dew point in the low-temperature storage chamber.

7 Claims, 11 Drawing Sheets

(51) Int. Cl.
*F25D 17/04* (2006.01)
*F25D 17/06* (2006.01)
(52) U.S. Cl.
CPC ... *B01L 2300/10* (2013.01); *B01L 2300/1894* (2013.01); *F25D 2317/0411* (2013.01)

(56) References Cited

U.S. PATENT DOCUMENTS

| | | | | |
|---|---|---|---|---|
| 6,155,060 | A * | 12/2000 | Parkman | A47F 3/001 62/271 |
| 2006/0156753 | A1 * | 7/2006 | Fuhr | A01N 1/144 62/78 |
| 2009/0188272 | A1 * | 7/2009 | Cloutier | F25D 25/04 62/378 |
| 2010/0183408 | A1 * | 7/2010 | Malin | B01L 7/50 414/222.01 |
| 2012/0060541 | A1 * | 3/2012 | Hunt | G01N 35/04 312/107 |
| 2016/0084564 | A1 * | 3/2016 | Malin | G01N 35/04 62/266 |

FOREIGN PATENT DOCUMENTS

| | | |
|---|---|---|
| JP | 5066563 B2 | 11/2012 |
| JP | 2017-48035 A | 3/2017 |
| JP | 2019-187257 A | 10/2019 |
| JP | 2020-148390 A | 9/2020 |
| WO | 2017/038257 A1 | 3/2017 |

OTHER PUBLICATIONS

Written Opinion of the International Searching Authority (Form PCT/ISA/237) dated Nov. 30, 2021, issued in counterpart International Application No. PCT/JP2021/033893. (3 pages).

Notice of Reasons for Refusal dated Feb. 24, 2021, issued in counterpart of Japanese Patent Application No. 2020-209379, with English Translation (7 pages).

Office Action Dated May 15, 2025, issued in counterpart CN application No. 202180078724.6, with English translation. (19 pages).

* cited by examiner

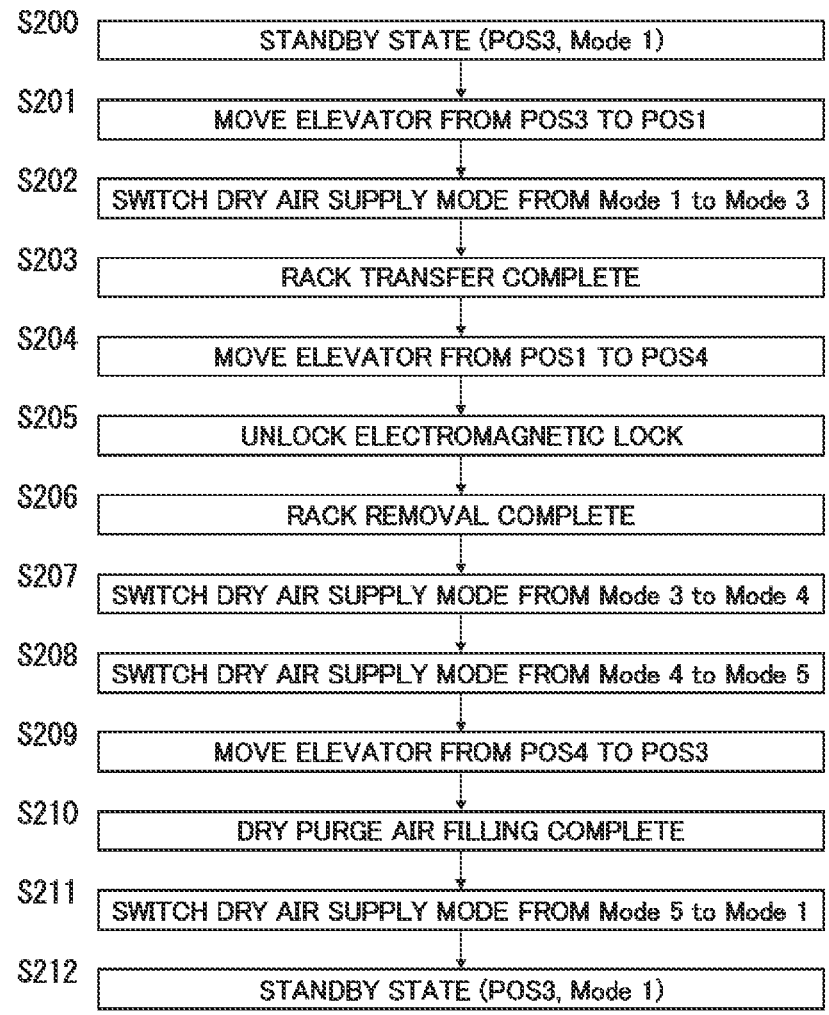

LOW-TEMPERATURE STORAGE SYSTEM

BACKGROUND OF THE INVENTION

1. Field of the Invention

The present invention relates to a low-temperature storage system that stores vessels containing samples at low temperatures, and more particularly to a low-temperature storage system for cryogenic storage of samples for drug development used in the processes of discovering or designing drugs in medical science, bioengineering, and pharmaceutical sciences.

2. Description of the Related Art

Low-temperature storage systems are commonly known in medical science, bioengineering, and pharmaceutical sciences. Tubes containing samples for drug development used in the processes of discovering or designing drugs are held in racks, which are stored in a low-temperature storage chamber that maintains a stable environment of extremely low temperature.

In such a low-temperature storage system, loading and unloading of racks into and out of the low-temperature storage chamber, and picking (transfer between racks) of tubes inside the low-temperature storage chamber, are each carried out by a dedicated mechanism.

When racks enter or exit the low-temperature storage chamber, the interior of the low-temperature storage chamber is brought into communication with the exterior. This may lead to issues such as a temperature rise or frost buildup due to the factors in the external environment such as humidity of the outside atmosphere (e.g., moisture entering the low-temperature storage chamber).

It is the common practice to create a dry atmosphere in the anteroom area that is in communication with the low-temperature storage chamber to minimize moisture penetration into the low-temperature storage chamber.

For example, in Japanese Patent Application Publication No. 2017-048035, an anteroom area accommodating a low-temperature storage chamber and a loading/unloading mechanism are housed in an outer cover and separated from the external environment, and this anteroom area is dehumidified with dry air or nitrogen gas.

Japanese Patent Application Publication No. 2019-187257 describes an anteroom serving as a precooling chamber for precooling storage objects, disposed between a reception chamber serving as a preparation chamber for receiving the storage objects and a storage chamber configured to store the storage objects. The interior of the anteroom, which is the anteroom area, is managed to maintain a low temperature atmosphere, with dehumidified dry air being supplied into the anteroom.

SUMMARY OF THE INVENTION

To minimize moisture penetration into the low-temperature storage chamber, the anteroom area is required to maintain a low dew point environment as close to the interior environment of the low-temperature storage chamber as possible. Such a low dew point environment necessitates a large high-specification dry air generator capable of consistently supplying a large amount of low dew point dry air.

The anteroom area is necessarily large due to the need to dispose various equipment around the low-temperature storage chamber, such as drive units for shutters for closing the opening that connects the low-temperature storage chamber and the anteroom area, and mechanisms for loading/unloading storage objects into and out of the low-temperature storage chamber. This easily leads to an increase in the size of the dry air generator or the low-temperature storage system itself. The regulation of the atmosphere in the anteroom area using dry purge air for example tends to take a long time, which causes an issue of increased exposure time for storage objects to an atmosphere of a higher temperature than that of the low-temperature storage chamber.

The present invention was made under the circumstances described above and it is an object of the invention to provide a low-temperature storage system that ensures minimal penetration of moisture into the low-temperature storage chamber from an external environment without involving an increase in size or complexity of the system configuration.

The present invention achieves the above object by providing a low-temperature storage system including: a low-temperature storage chamber storing a storage object at a low temperature; and a loading/unloading mechanism for loading and unloading the storage object into and out of the low-temperature storage chamber, the loading/unloading mechanism including an entry/exit preparation chamber attached to the low-temperature storage chamber and divided from an external environment and the low-temperature storage chamber, the entry/exit preparation chamber including a first anteroom having an interior space controlled to maintain a lower dew point D1 than that of the external environment, and a second anteroom disposed between the first anteroom and the low-temperature storage chamber and having an interior space controlled to maintain a dew point D2 that is between the dew point D1 in the first anteroom and a dew point D0 in the low-temperature storage chamber. The system further includes a dry air supply mechanism including a first gas supply line that supplies dry purge air having the dew point D1 to the first anteroom, a second gas supply line that supplies dry air having the dew point D1 to the first anteroom, a third gas supply line that supplies dry air having the dew point D2 to the second anteroom, and a single dry air generator for the first to third gas supply lines.

According to the low-temperature storage system set forth in claim 1, between the first anteroom controlled to maintain a lower dew point D1 in its interior space than that of the external environment, and the low-temperature storage chamber controlled to maintain a low temperature environment with the dew point D0, there is provided the second anteroom controlled to maintain the dew point D2 (D1>D2>D0) in its interior space. Therefore, the difference in dew point of the atmosphere between the two spaces that are brought into communication with each other during entry or exit operation is made smaller, so that the amount of moisture entering the low-temperature storage chamber can be reduced.

With the amount of moisture penetration into the low-temperature storage chamber reduced, the interval between defrosting operations required in the low-temperature storage system can be extended.

Moreover, since the low dew point environment is created only in the ancillary entry/exit preparation chamber of the low-temperature storage chamber, a desired atmosphere can be created in a relatively short time. This provides the advantage of reduced exposure time for storage objects to an atmosphere with a higher temperature than that of the interior of the low-temperature storage chamber.

Furthermore, the dry air having the dew point D1, dry purge air having the dew point D1, and dry air having the dew point D2 required in the entry and exit operation are all supplied by a single dry air generator, so that it is possible to prevent an increase in size and complexity of the system configuration.

According to the configuration set forth in claim 2, the entry/exit preparation chamber is provided such that the first anteroom is located under the external environment while the second anteroom is located inside the low-temperature storage chamber. Therefore, the interior environments of the first anteroom and second anteroom are less affected by the external environment, so that the atmosphere in each interior space of the first anteroom and second anteroom can readily be regulated as desired.

According to the configuration set forth in claim 3, the second anteroom is provided with a refrigeration fin for moisture in the atmosphere inside the second anteroom to form frost thereon. The second anteroom can thus be managed to maintain a low dew point environment closer to that of the low-temperature storage chamber.

According to the configuration set forth in claim 4, the second gas supply line has an air tank for temporarily storing the dry air supplied from the dry air generator. Therefore, the dry air generator itself does not require the capability of supplying a large amount of dry air, and yet the interior of the first anteroom can be regulated to a desired atmosphere in a short time.

According to the configuration set forth in claim 5, the third gas supply line includes a cooling unit that cools the dry air supplied from the dry air generator. The cooling unit is disposed inside the low-temperature storage chamber, so that the cool air inside the low-temperature storage chamber can be used in cooling the dry air and the thermal load of the cooling unit can be reduced.

According to the configuration set forth in claim 6, both the first anteroom shutter and the second anteroom shutter are configured to be movable along one axis with the placement stage, so that transfer of storage objects and opening/closing of the shutters are both achieved by the linear movement along one axis. This helps prevent an increase in size and complexity of the system configuration, reduce the frequency of troubles, and improve the ease of maintenance.

According to the configuration set forth in claim 7, the first anteroom shutter and the entry/exit shutter are each provided with a constant force spring. This way it is possible to implement a mechanism that causes the shutters to open and close in coordination with the operation of transferring storage objects with a simple structure.

BRIEF DESCRIPTION OF THE DRAWINGS

FIG. 13 is an operation flow chart for explaining the exit operation of a storage object out of the low-temperature storage chamber of the low-temperature storage system of the present invention.

DESCRIPTION OF THE PREFERRED EMBODIMENT

A low-temperature storage system according to the present invention will be hereinafter described with reference to the drawings.

Figure 1:
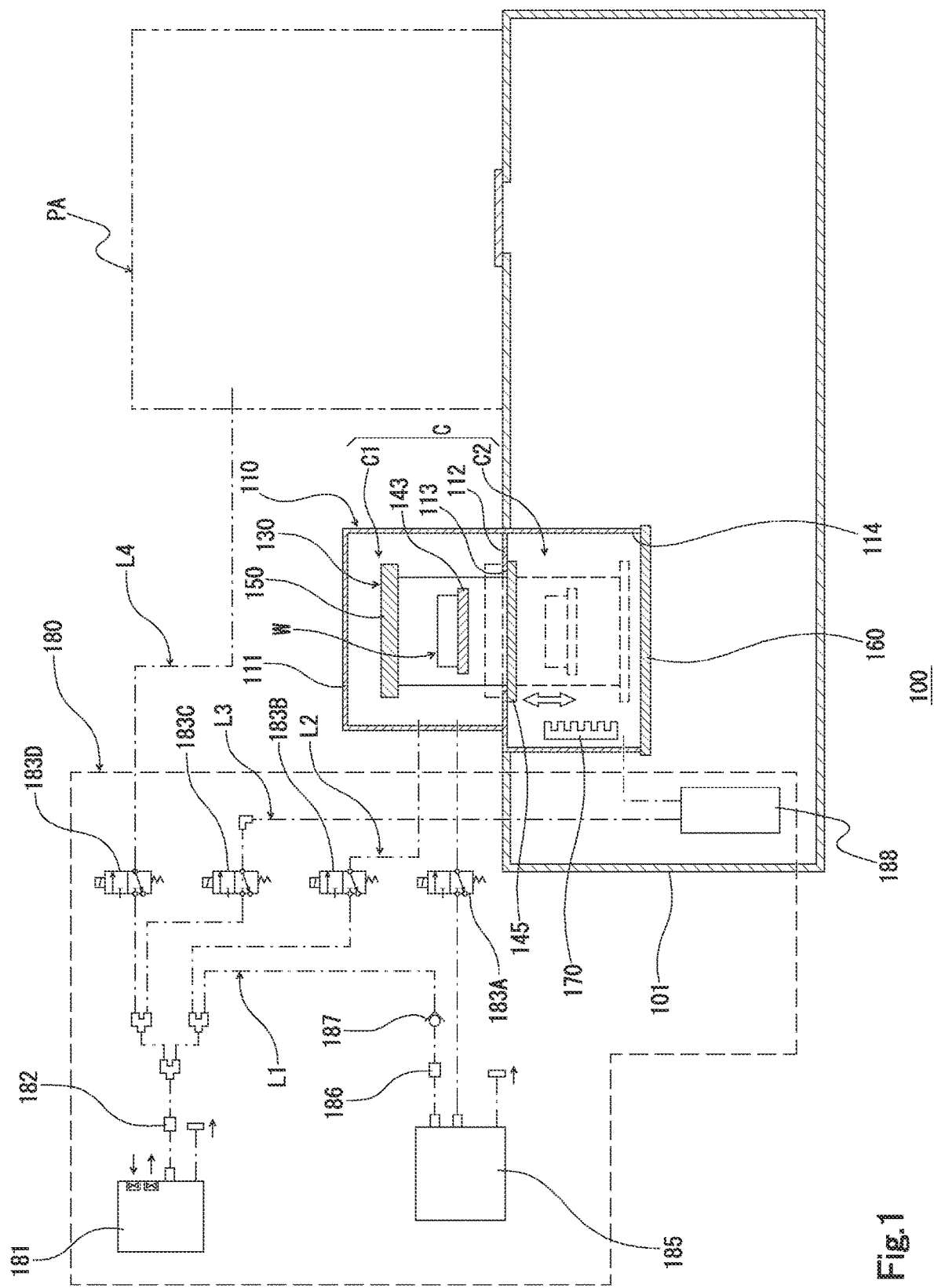
FIG. 1 is a schematic block diagram illustrating a configuration example of a low-temperature storage system according to the present invention.

The low-temperature storage system 100 according to one embodiment of the present invention stores storage racks each holding a plurality of tubes as storage objects W, and includes, as shown in FIG. 1, a low-temperature storage chamber 101 that stores the storage objects W at low temperatures, a loading/unloading mechanism 110 that loads and unloads storage objects W into and out of the low-temperature storage chamber 101, and a dry air supply mechanism 180 that supplies dry air to a space provided as an anteroom area between an external environment and the low-temperature storage chamber 101 to regulate the atmosphere in the area. The entire system is accommodated inside an external cover that is not shown. The two-dot chain line in FIG. 1 indicates a picking area PA where tubes are transferred from one to another of a storage rack and a transport rack.

Figure 2:
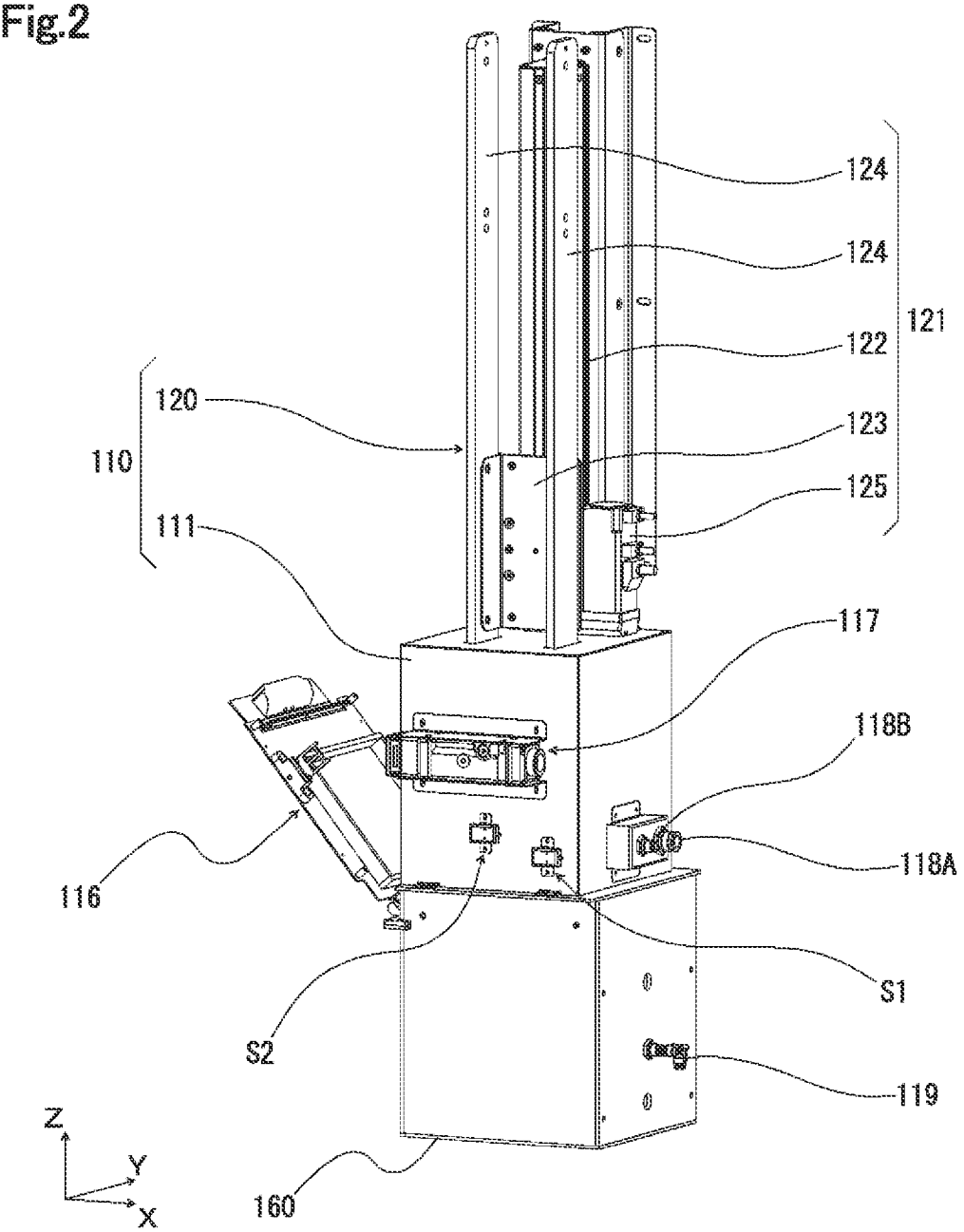
FIG. 2 is a perspective view from the front right illustrating a configuration example of the loading/unloading mechanism in the low-temperature storage system according to the present invention.
Figure 3:
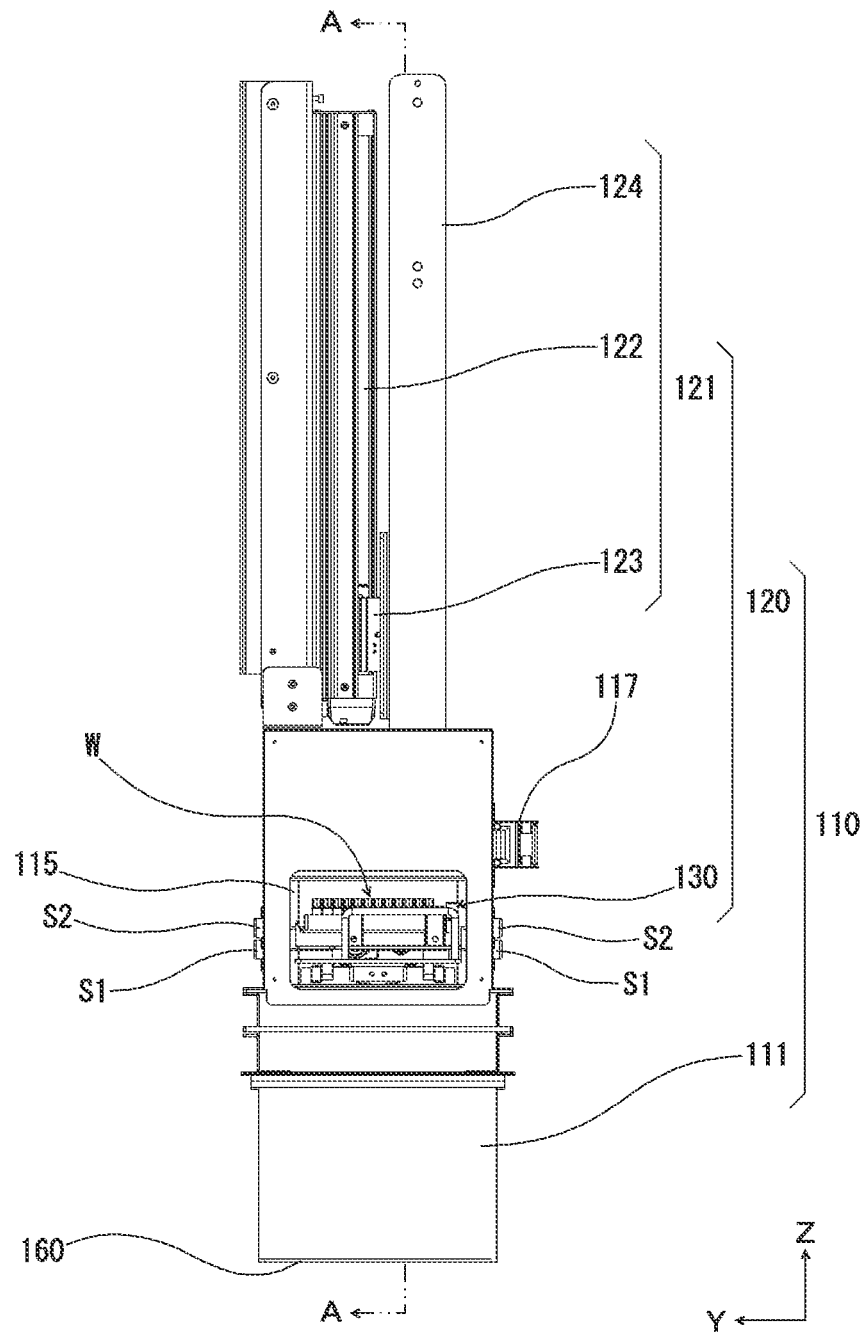
FIG. 3 is a left side view of the loading/unloading mechanism shown in FIG. 2.

As shown in FIG. 2 and FIG. 3, the loading/unloading mechanism 110 includes a housing 111 attached to an upper wall of the low-temperature storage chamber 101, and an entry/exit lifter 120 that transports the storage objects W in an up and down direction inside the housing 111.

Hereinafter, the up and down direction (vertical direction) is defined as the Z axis in a three-dimensional orthogonal coordinate system, and the direction perpendicular to the paper plane of FIG. 3, and the left and right direction, on a horizontal plane, are defined as the X axis and the Y axis, respectively.

The housing 111 defines an entry/exit preparation chamber C as the anteroom area positioned between the exterior environment and the low-temperature storage chamber 101.

The housing is formed such as to protrude into the low-temperature storage chamber 101, with an entry/exit opening 114 facing down.

Figure 4:
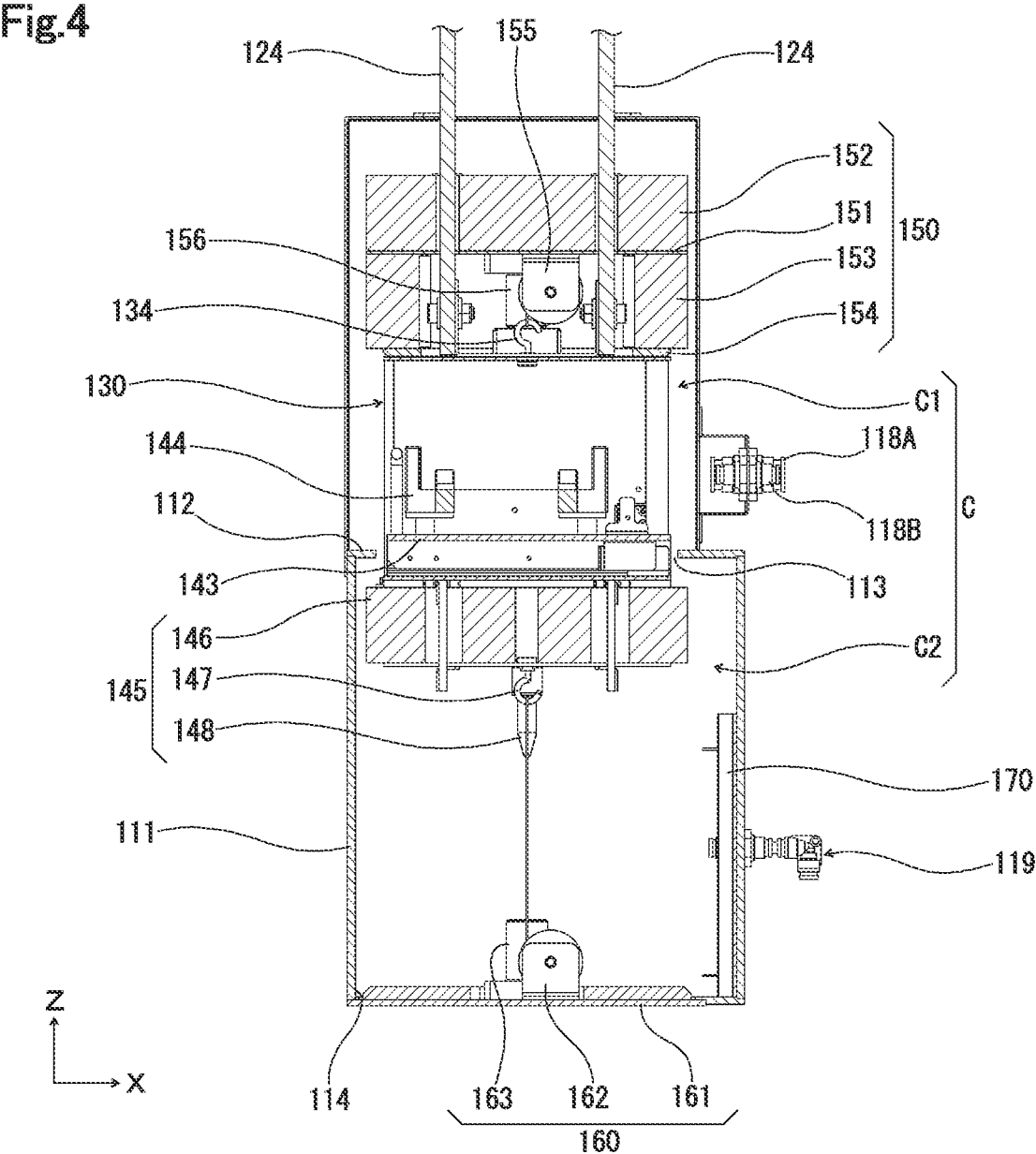
FIG. 4 is a schematic cross-sectional view illustrating the configuration in a cross section along line A-A in FIG. 3 when the low-temperature storage system of the present invention is in a standby state.

The interior space of the housing 111 is divided into upper and lower parts by a partition wall 112 extending along an X-Y plane as also shown in FIG. 4. The upper space positioned outside the low-temperature storage chamber 101 is configured as a first anteroom C1, and the lower space positioned inside the low-temperature storage chamber 101 is configured as a second anteroom C2.

The partition wall 112 has a passage opening 113 connecting the first anteroom C1 and second anteroom C2 in communication with each other and configured to allow passage of an elevator 130 that has a rack placement stage 143.

The second anteroom C2 is provided with an entry/exit shutter 160 capable of opening and closing the entry/exit opening 114 from inside the low-temperature storage chamber 101.

In one side wall that defines the first anteroom C1 of the housing 111 is provided a loading/unloading opening 115 that opens in the X-axis direction to allow access to the entry/exit preparation chamber C, with a loading/unloading door 116 to open and close the loading/unloading opening 115.

The loading/unloading door 116 is kept shut by an electromagnetic locking device 117 during entry and exit of storage objects W into and out of the low-temperature storage chamber 101. The electromagnetic locking device 117 is unlocked to allow opening and closing of the door when storage objects W are carried into or out of the entry/exit preparation chamber C.

The entry/exit lifter 120 includes a drive unit 121, the elevator 130, a first anteroom shutter 150, and a second anteroom shutter 145.

The drive unit 121 is configured by a linear actuator, for example, and includes a guide rail 122 fixed to the upper wall of the housing 111 and extending in the up and down direction, a movable member 123 movable up and down along the guide rail 122, a pair of vertically extending elevator guide plates 124 fixed to the movable member 123 and spaced apart in the X-axis direction, and a drive source 125. The elevator guide plates 124 are hermetically passed through insertion holes formed in the upper wall of the housing 111 such that the lower ends protrude into the entry/exit preparation chamber C, and slidable relative to the housing 111.

Figure 5:
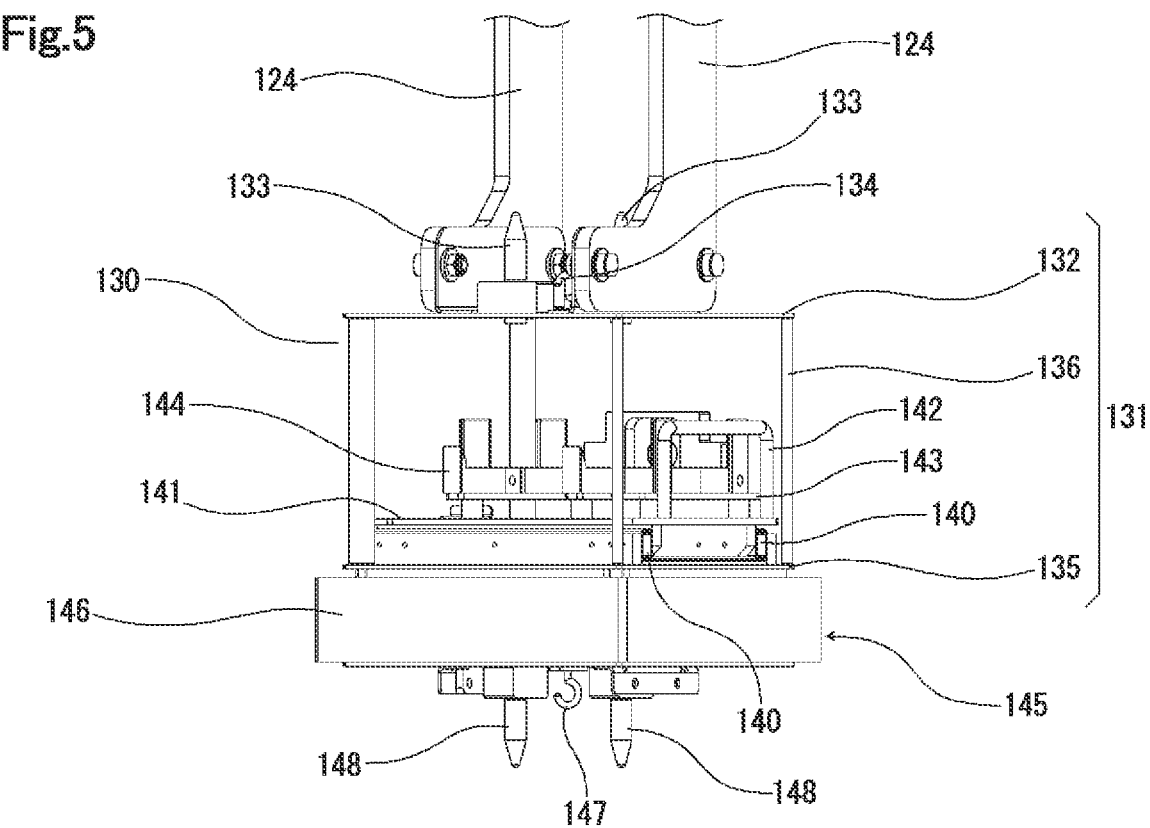
FIG. 5 is a perspective view illustrating the configuration of the elevator in the loading/unloading mechanism shown in FIG. 2.

As shown in FIG. 5, the elevator 130 includes a base frame 131, which is made up of an upper base plate 132 and a lower base plate 135 each extending in the X-Y plane, vertically spaced apart and opposite each other, and upright support shafts 136 fixedly attached in four corners of the lower base plate 135 and connecting the upper base plate 132 and lower base plate 135.

On the upper surface of the upper base plate 132 are provided a pair of positioning pin members 133 in a center portion in the X-axis direction, spaced apart in the Y-axis direction, with a hook member 134 between the positioning pin members 133.

On the upper surface of the lower base plate 135 are a pair of slide rails 140 extending in the X-axis direction parallel to each other and spaced apart in the Y-axis direction.

A plate-like manual sliding table 141 with a handle 142 fixed thereto is provided above the slide rails 140 such as to be slidable in the X-axis direction on the slide rails 140. The rack placement stage 143 is fixedly set on the manual sliding table 141, vertically spaced from the table.

A rack guide 144 is fixedly attached on the upper surface of the rack placement stage 143 for holding storage objects W.

When a storage object W is to be stored, the manual sliding table 141 is pulled out of the housing 111 through the loading/unloading opening 115 of the housing 111; the storage object W is then set on the rack guide 144.

The lower ends of the elevator guide plates 124 are fixed to the upper surface of the upper base plate 132 on either side in the X-axis direction of the positioning pin members 133 and hook member 134. Thus the elevator 130 is configured to be movable back and forth in the up and down direction with the movement of the elevator guide plates 124.

The second anteroom shutter 145 is integrally provided under the lower base plate 135. The second anteroom shutter 145 is configured to be movable back and forth in the up and down direction in coordination with the movement of the elevator 130.

The second anteroom shutter 145 opens and closes the passage opening 113 from inside the second anteroom C2, and is formed by a flat rectangular parallelepiped heat insulator 146.

In a center portion on the lower surface of the heat insulator 146 are provided a hook member 147 and a pair of positioning pin members 148 spaced apart in the Y-axis direction, one each on either side of the hook member 147.

Figure 6:
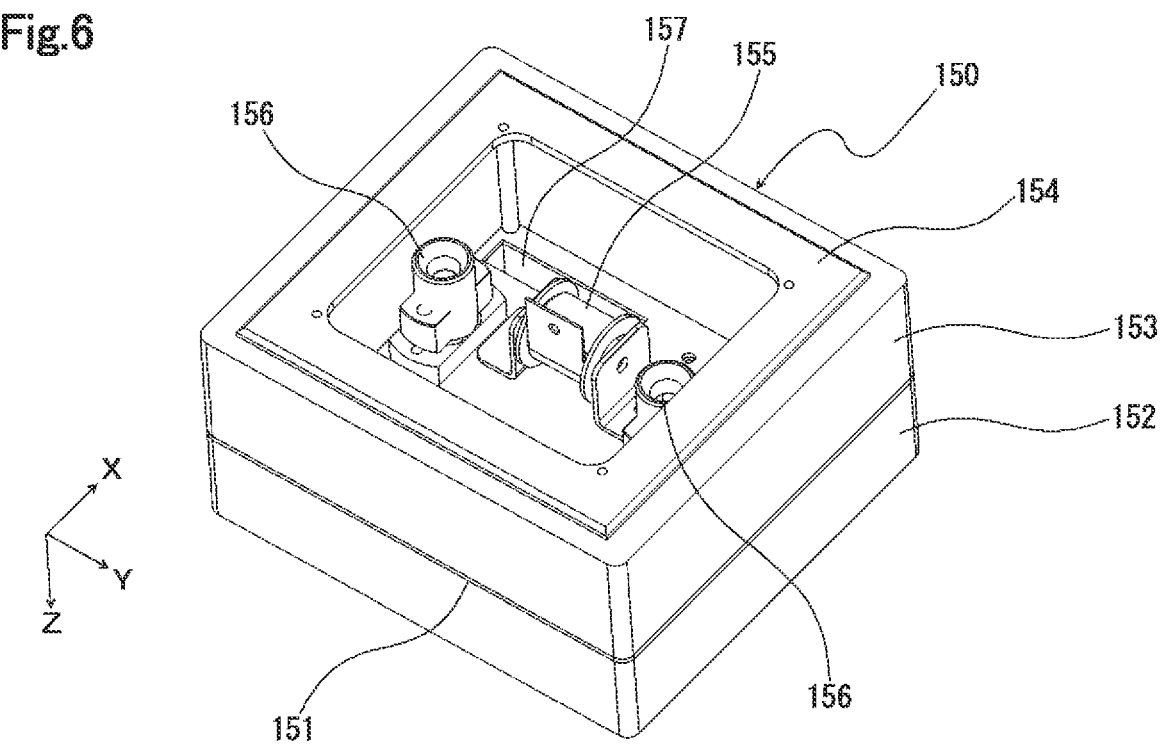
FIG. 6 is a perspective view from the bottom side illustrating the configuration of the first anteroom shutter of the loading/unloading mechanism shown in FIG. 2.

The passage opening 113 connecting the first anteroom C1 and second anteroom C2 in communication with each other is opened and closed by the first anteroom shutter 150 from inside the first anteroom C1. As shown in FIG. 6, the first anteroom shutter 150 includes a plate-like base member 151, a flat rectangular parallelepiped heat insulator 152 fixed on the upper surface of the base member 151, a rectangular frame-like heat insulator 153 fixed on the lower surface of the base member 151, and a rectangular frame-like lid guide plate 154 fixed on the lower surface of the heat insulator 153 and to be abutted on the upper base plate 132 of the elevator 130.

On the lower surface of the base member 151 is provided a first constant force spring 155. The hook member 134 provided on the upper base plate 132 of the elevator 130 is hooked to the spring so that the elevator 130 and the first anteroom shutter 150 are pulled toward each other.

On the lower surface of the base member 151 are also provided a pair of pin guide members 156 spaced apart in the Y-axis direction with the first constant force spring 155 positioned therebetween and configured to receive the positioning pin members 133 provided to the upper base plate 132 of the elevator 130.

The first constant force spring 155 and pin guide members 156 are disposed inside the space surrounded by the heat insulator 153.

Through holes 157 extend through each of the base member 151 and heat insulator 152 in their thickness direction, and the elevator guide plates 124 pass through these through holes in an airtight manner. The first anteroom shutter 150 is disposed such that the lid guide plate 154 abuts on the upper base plate 132 of the elevator 130 by the weight of the first anteroom shutter 150. The first anteroom shutter 150 is thus configured to be movable back and forth in the up and down direction in coordination with the movement of the elevator 130.

Figure 7:
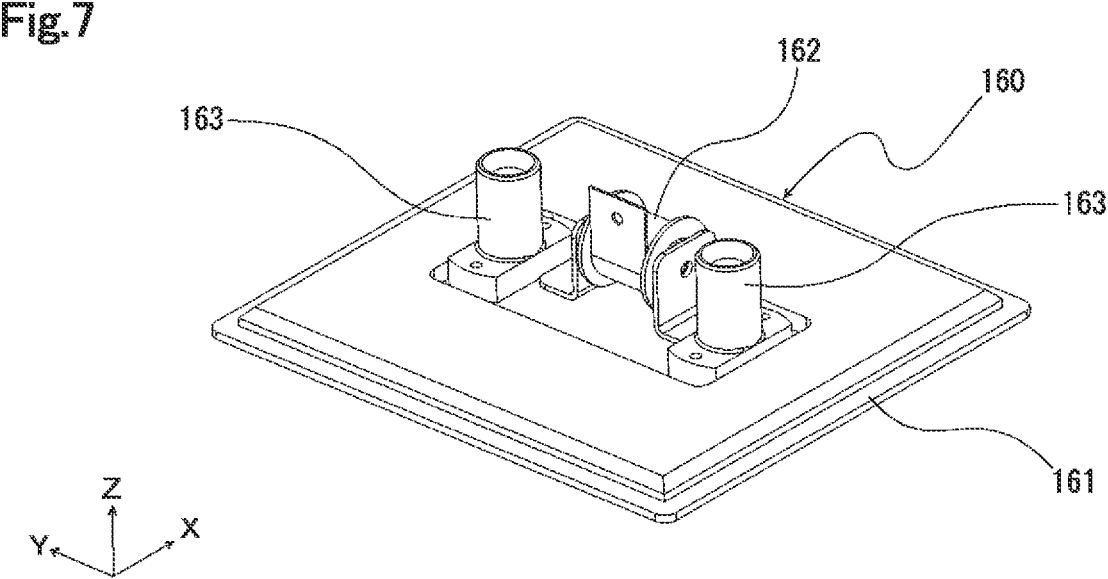
FIG. 7 is a perspective view from the top side illustrating the configuration of the entry/exit shutter of the loading/unloading mechanism shown in FIG. 2.

The entry/exit shutter 160 has a rectangular lid plate 161 as shown in FIG. 7.

On the upper surface of the lid plate 161 is provided a second constant force spring 162, which pulls the elevator 130 and the entry/exit shutter 160 toward each other. The hook member 147 provided to the second anteroom shutter 145 is hooked to this second constant force spring 162 so that the entry/exit shutter 160 is movable back and forth in the up and down direction in coordination with the movement of the elevator 130.

On the upper surface of the lid plate 161 are also provided a pair of pin guide members 163 spaced apart in the Y-axis direction with the second constant force spring 162 positioned therebetween and configured to receive the positioning pin members 148 provided to the second anteroom shutter 145.

The first anteroom shutter 150, second anteroom shutter 145, and entry/exit shutter 160 are configured in this manner to be movable back and forth in the up and down direction, coordinating with the movement of the elevator 130, so that transfer of storage objects W and opening/closing of the shutters are both achieved by up and down linear movements of the elevator 130. Therefore, the system can be configured without an increase in size and complexity, which reduces the frequency of troubles and improves the ease of maintenance.

The first anteroom shutter 150 and entry/exit shutter 160 are each provided with a constant force spring and thus the mechanism whereby the shutters open and close in coordination with the operation of transferring storage objects W is implemented in a simple structure.

In this low-temperature storage system 100, the interior space of the first anteroom C1 is controlled to maintain a lower dew point D1 than that of the external environment, and the interior space of the second anteroom C2 is controlled to maintain a dew point D2 that is between the dew point D1 in the first anteroom C1 and the dew point D0 in the low-temperature storage chamber 101. Therefore, the difference in dew point of the atmosphere between the two spaces that are brought into communication with each other during entry or exit operation is made smaller, so that the amount of moisture entering the low-temperature storage chamber 101 can be reduced. With the amount of moisture penetration into the low-temperature storage chamber 101 reduced, the interval between defrosting operations required in the low-temperature storage system 100 can be extended.

Since the low dew point environment is created only in the ancillary entry/exit preparation chamber C of the low-temperature storage chamber 101, a desired atmosphere can be created in a relatively short time. This provides the advantage of reduced exposure time for storage objects to an atmosphere with a higher temperature than that of the interior environment of the low-temperature storage chamber 101.

To give specific examples, the low-temperature storage chamber 101 and entry/exit preparation chamber C are respectively controlled to maintain an interior atmosphere as follows: the atmosphere in the low-temperature storage chamber 101 is regulated to have a temperature of −80° C. and a dew point D0 of −80° C.; the atmosphere in the first anteroom C1 is regulated to have a room temperature and a dew point D1 in the range of 0 to −20° C.; and the atmosphere in the second anteroom C2 is regulated to have a temperature of −30° C. and a dew point D2 of −30° C.

As described above, the entry/exit preparation chamber C is formed such that the first anteroom C1 is located outside the low-temperature storage chamber 101 while the second anteroom C2 is located inside the low-temperature storage chamber 101. Therefore, the interior environments of the first anteroom C1 and second anteroom C2 are less affected by the external environment, so that each interior space of the first anteroom C1 and second anteroom C2 can readily be regulated to a desired atmosphere.

Inside the second anteroom C2 is provided a refrigeration fin 170 so that the moisture contained in the atmosphere inside the second anteroom C2 forms frost thereon. The second anteroom C2 can thus be controlled to maintain a low dew point environment closer to that of the low-temperature storage chamber 101.

Figure 8:
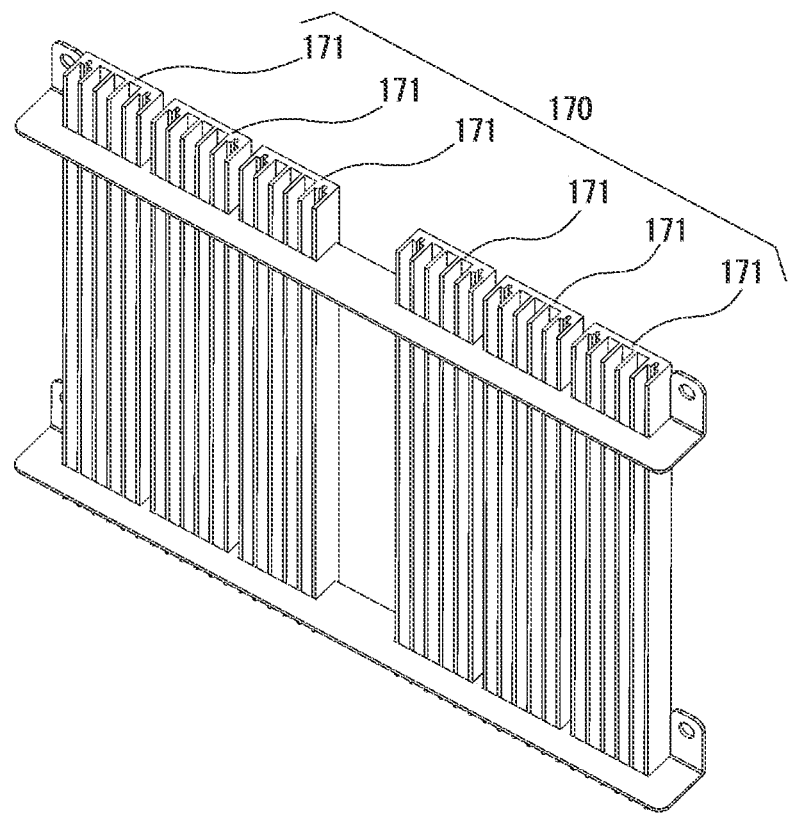
FIG. 8 is a perspective view illustrating a configuration example of a refrigeration fin.

The refrigeration fin 170 is configured with a plurality of fin elements 171 arranged side by side in the Y-axis direction, for example, as shown in FIG. 8. Each of the fin elements 171 has a plurality of cooling plates extending in the up and down direction perpendicularly to the Y axis and spaced apart and opposite each other in the Y-axis direction.

The atmosphere inside the first anteroom C1 and second anteroom C2 is regulated by supplying dry air to the first anteroom C1 and second anteroom C2.

As shown in FIG. 1, the dry air supply mechanism 180 includes a first gas supply line L1 that supplies dry purge air having the dew point D1 to the first anteroom C1, a second gas supply line L2 that supplies dry air having the dew point D1 to the first anteroom C1, a third gas supply line L3 that supplies dry air having the dew point D2 to the second anteroom C2, a fourth gas supply line L4 that supplies dry purge air having the dew point D1 to the picking area PA, and a single dry air generator 181 for the first to fourth gas supply lines L1 to L4. Reference numeral 182 in FIG. 1 denotes a dew point meter that detects the dew point of the dry air supplied from the dry air generator 181.

This low-temperature storage system 100 uses one (single) dry air generator 181 to supply dry air having the dew point D1, dry purge air having the dew point D1, and dry air having the dew point D2 required in the entry and exit operation, to avoid an increase in size and complexity of the system configuration.

The first to fourth gas supply lines L1 to L4 are respectively provided with electromagnetic valves 183A, 183B, 183C, and 183D. The dry air supply modes are switched from one to another by controlling the opening/closing of each of the electromagnetic valves 183A, 183B, 183C, and 183D.

The first gas supply line L1 has an air tank 185 for temporarily storing the dry air supplied from the dry air generator 181. Therefore, the dry air generator 181 itself does not require the capability of supplying a large amount of dry air, and yet the interior space of the first anteroom C1 can be regulated to a desired atmosphere in a short time.

A pressure gauge 186 is provided in this first gas supply line L1 upstream of the air tank 185 in the direction of the dry air flow, to monitor the flow rate of the dry air stored in the air tank 185. Reference numeral 187 in FIG. 1 denotes a check valve.

The dry purge air having the dew point D1 supplied from the first gas supply line L1 is introduced into the first anteroom C1 through a dry purge air supply part 118A provided in a side wall (right side wall) of the housing 111 opposite the side wall with the loading/unloading opening 115 in the X-axis direction.

The dry air having the dew point D1 supplied from the second gas supply line L2 is introduced into the first anteroom C1 through a dry air supply part 118B disposed side by side with the dry purge air supply part 118A.

The third gas supply line L3 includes a cooling unit 188 that cools the dry air supplied from the dry air generator 181 to generate dry air having the dew point D2.

The cooling unit 188 is located inside the low-temperature storage chamber 101 so that the cool air inside the low-temperature storage chamber 101 can be used in cooling the dry air and the thermal load of the cooling unit 188 can be reduced.

The dry air having the dew point D2 supplied from the third gas supply line L3 is introduced into the second anteroom C2 through a dry air supply part 119 provided in a right side wall that defines the second anteroom C2.

Figure 9:
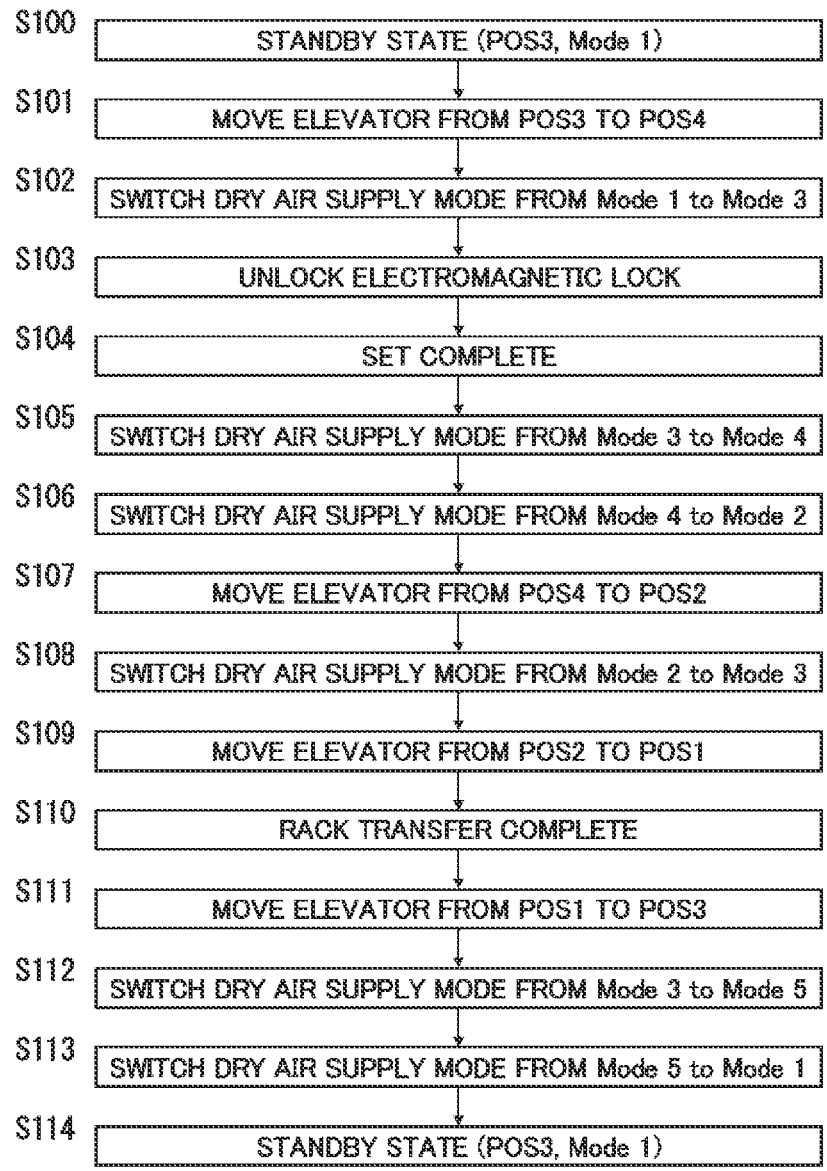
FIG. 9 is an operation flow chart for explaining the entry operation of a storage object into the low-temperature storage chamber of the low-temperature storage system of the present invention.

Below, the entry operation of a storage object W in the low-temperature storage system 100 is described with reference to FIG. 9.

This low-temperature storage system 100 is normally set to a standby state (S100). In the standby state, the elevator 130 is in the standby position (POS3) lower than the position where the second anteroom shutter 145 closes the passage opening 113 in the partition wall 112 as shown in FIG. 4. The dry air supply mode at this time is set to a first dry air supply mode (Mode 1) in which dry air is supplied into the second anteroom C2 and picking area PA. In the first dry air supply mode (Mode 1), the electromagnetic valves 183A and 183B are closed, while the electromagnetic valves 183C and 183D are opened.

Figure 10:
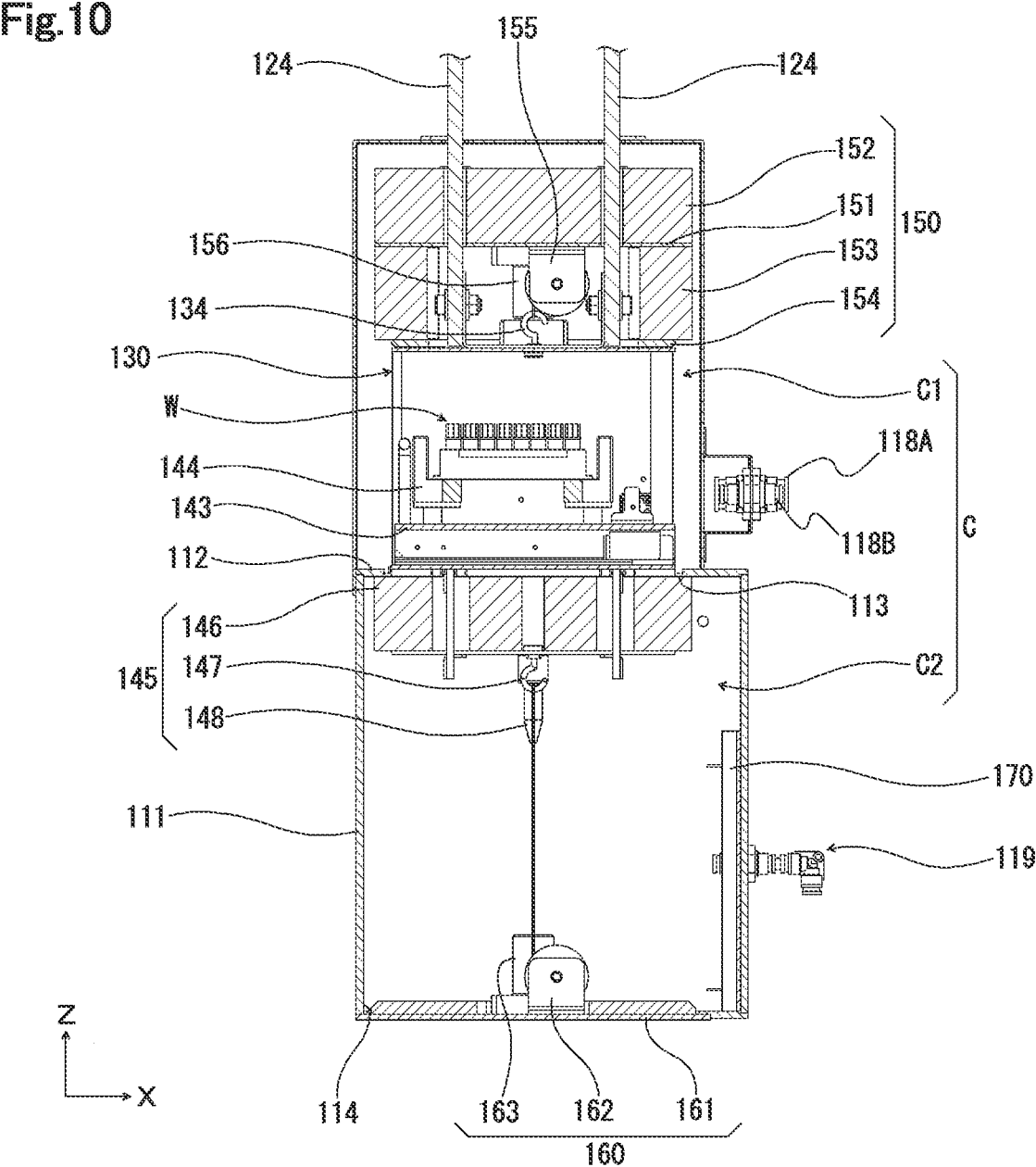
FIG. 10 is a cross-sectional view illustrating a condition inside the entry/exit preparation chamber when loading or unloading a storage object into or out of the entry/exit preparation chamber.

For a storage object W to enter the low-temperature storage chamber 101, first, the elevator 130 is moved upward by the drive unit 121 from the standby position (POS3) to an entry/exit position (POS4) for entry and exit of the storage object W (S101), on condition that dry air having the dew point D1 is stored in the air tank 185 so that the pressure in the air tank 185 is at a preset level. With the elevator 130 at the entry/exit position (POS4), the second anteroom shutter 145 closes the passage opening 113 from inside the second anteroom C2 as shown in FIG. 10 so that the first anteroom C1 is hermetically separated from the second anteroom C2.

When a position recognition sensor S1 for the manual sliding table detects the elevator 130 being in the entry/exit position (POS4), the dry air supply mode is switched from the first dry air supply mode (Mode 1) to a third dry air supply mode (Mode 3) in which dry air having the dew point D1 is supplied into the first anteroom C1 (S102). Namely, the electromagnetic valve 183B is switched from the closed state to an open state, and the electromagnetic valves 183C and 183D are switched from the open state to the closed state. The electromagnetic valve 183A is kept closed.

Upon switching of the dry air supply mode, the electromagnetic lock of the loading/unloading door 116 is unlocked (S103), and the storage object W is manually set on the rack placement stage 143. Specifically, the loading/unloading door 116 is opened, the manual sliding table 141 is pulled out of the entry/exit preparation chamber C, and the storage object W is held on the rack guide 144. After that, the manual sliding table 141 is pushed back into the entry/exit preparation chamber C, and the loading/unloading door 116 is closed. The loading/unloading door 116 is then locked by the electromagnetic locking device 117. With a rack presence sensor S2 detecting the presence of the storage object W, the setting of the storage object W is complete (S104).

Upon completion of the setting of the storage object W, the dry air supply mode is switched from the third dry air supply mode (Mode 3) to a fourth dry air supply mode (Mode 4) in which dry purge air having the dew point D1 stored in the air tank 185 is supplied into the first anteroom C1 (S105). Namely, the electromagnetic valve 183A is switched from the closed state to the open state, and the electromagnetic valve 183B is switched from the open state to the closed state. The electromagnetic valves 183C and 183D are kept closed.

After a predetermined time has passed after the switching of the dry air supply mode, i.e., after the interior of the first anteroom C1 has been purged with the dry purge air having the dew point D1, the dry air supply mode is switched from the fourth dry air supply mode (Mode 4) to a second dry air supply mode (Mode 2) in which dry air having the dew point D2 is supplied into the second anteroom C2 (S106). Namely, the electromagnetic valve 183C is switched from the closed state to the open state, and the electromagnetic valve 183A is switched from the open state to the closed state. The electromagnetic valves 183B and 183D are kept closed.

Figure 11:
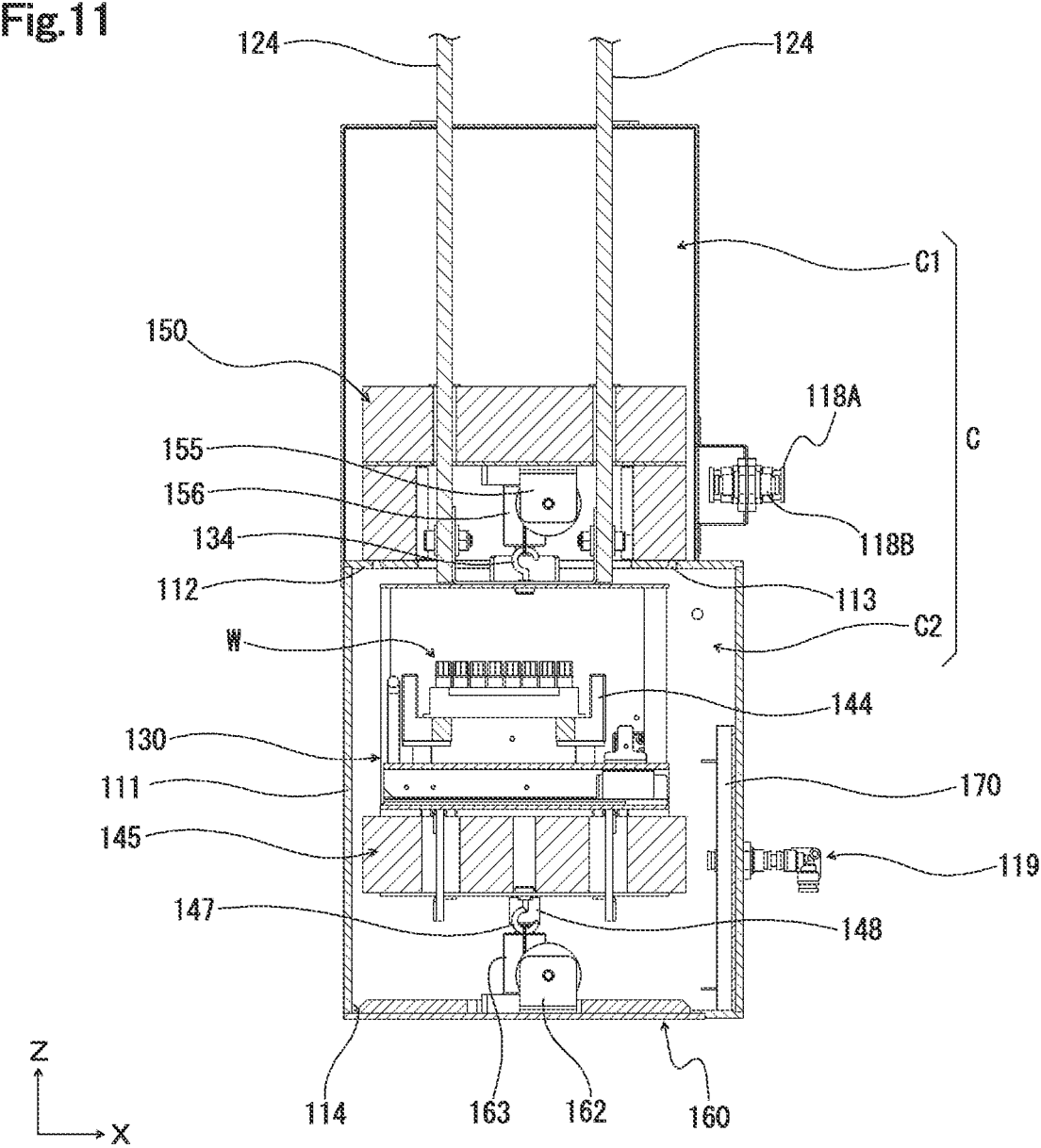
FIG. 11 is a cross-sectional view illustrating a condition inside the entry/exit preparation chamber when the storage object is positioned inside the second anteroom.

After that, the elevator 130 is moved downward by the drive unit 121 from the entry/exit position (POS4) inside the first anteroom C1 to a defrost position (POS2) inside the second anteroom C2 (S107). With the elevator 130 at the defrost position (POS2), the passage opening 113 is closed by the first anteroom shutter 150 coordinating with the elevator 130 from inside the first anteroom C1 as shown in FIG. 11.

With the elevator 130 at the defrost position (POS2), after a predetermined time has passed, i.e., for the moisture that entered the second anteroom C2 with the movement of the elevator 130 to form frost on the refrigeration fin 170, the dry air supply mode is switched from the second dry air supply mode (Mode 2) to the third dry air supply mode (Mode 3) (S108). Namely, the electromagnetic valve 183B is switched from the closed state to the open state, and the electromagnetic valve 183C is switched from the open state to the closed state. The electromagnetic valves 183A and 183D are kept closed.

Figure 12:
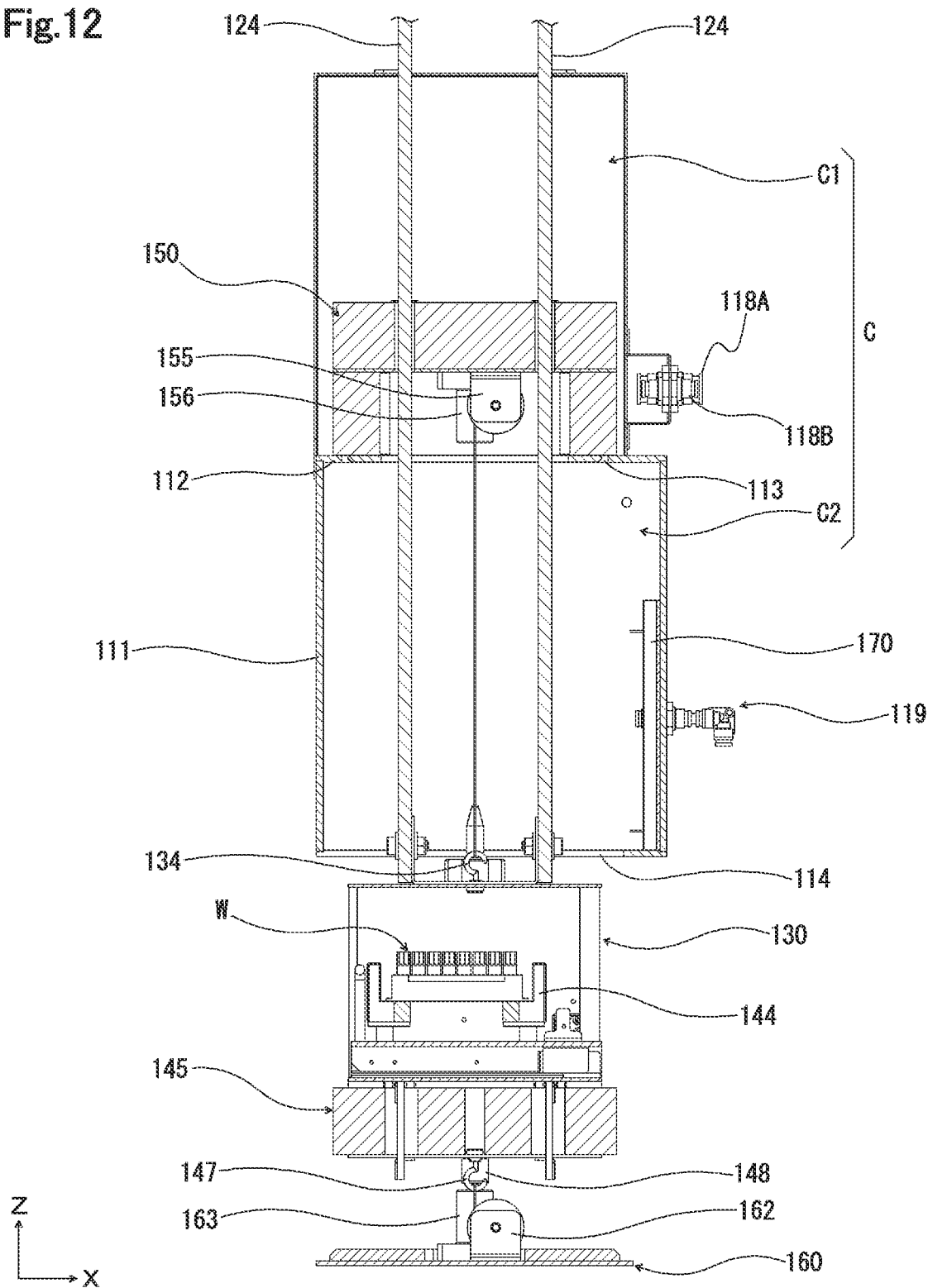
FIG. 12 is a cross-sectional view illustrating a condition inside the entry/exit preparation chamber when the storage object is positioned inside the low-temperature storage chamber.

Upon this change of the dry air supply mode, the elevator 130 is moved with the entry/exit shutter 160 further down by the drive unit 121 from the defrost position (POS2) inside the second anteroom C2 to a loading/unloading position (POS1) inside the low-temperature storage chamber 101 (S109). With the elevator 130 at the loading/unloading position (POS1), the passage opening 113 is kept hermetically closed by the first anteroom shutter 150 by the spring force of the first constant force spring 155 that pulls the first anteroom shutter 150 toward the elevator 130 as shown in FIG. 12.

The transfer operation of the storage object W is performed in this state where the elevator 130 is set in the loading/unloading position (POS1).

Upon completion of the transfer operation of the storage object W (S110), the elevator 130 is moved with the entry/exit shutter 160 upward by the drive unit 121 from the loading/unloading position (POS1) to the standby position (POS3) (S111). In this state, as shown in FIG. 4, the entry/exit opening 114 is hermetically closed by the entry/exit shutter 160 by the spring force of the second constant force spring 162 that pulls the entry/exit shutter 160 toward the elevator 130.

After that, the dry air supply mode is switched from the third dry air supply mode (Mode 3) to a fifth dry air supply mode (Mode 5) in which the air tank 185 is filled with dry purge air having the dew point D1 (S112). Namely, the electromagnetic valve 183B is switched from the open state to the closed state. The electromagnetic valves 183A, 183C, and 183D are kept closed.

When the air tank 185 is filled with dry purge air having the dew point D1, i.e., when the pressure gauge 186 detects that the pressure inside the air tank 185 has reached a predetermined level, the dry air supply mode is switched from the fifth dry air supply mode (Mode 5) to the first dry air supply mode (Mode 1) (S113) so that the low-temperature storage system 100 assumes the standby state (S114).

Next, the exit operation of a storage object W in the low-temperature storage system 100 is described with reference to FIG. 13.

As described above, this low-temperature storage system 100 is set to the standby state (S200) at the start of the operation for storing a storage object W. Namely, the elevator 130 is at the standby position (POS3), and the dry air supply mode is set to the first dry air supply mode (Mode 1).

For a storage object W to exit the low-temperature storage chamber 101, first, the elevator 130 is moved downward with the entry/exit shutter 160 by the drive unit 121 from the standby position (POS3) to the loading/unloading position (POS1) (S201), on condition that dry air having the dew point D1 is stored in the air tank 185 so that the pressure in the air tank 185 is at a preset level or more. With the elevator 130 at the loading/unloading position (POS1), the first anteroom shutter 150 closes the passage opening 113 from inside the first anteroom C1 as described above so that the first anteroom C1 is hermetically separated from the second anteroom C2 that is in communication with the low-temperature storage chamber 101.

When the elevator 130 is moved to the loading/unloading position (POS1), the dry air supply mode is switched from the first dry air supply mode (Mode 1) to the third dry air supply mode (Mode 3) so that dry air having the dew point D1 is supplied into the first anteroom C1 (S202).

In this state, the transfer operation is performed, in which the storage object W is transferred onto the rack placement stage 143 to be held by the rack guide 144.

Upon completion of the transfer operation of the storage object W (S203), the elevator 130 is moved with the entry/exit shutter 160 upward by the drive unit 121 from the loading/unloading position (POS1) to the entry/exit position (POS4) (S204). The entry/exit shutter 160 thus closes the entry/exit opening 114 so that the entry/exit preparation chamber C is hermetically separated from the low-temperature storage chamber 101, and at the same time, the passage opening 113 is closed by the second anteroom shutter 145 from inside the second anteroom C2 so that the first anteroom C1 is hermetically separated from the second anteroom C2.

When the position recognition sensor S1 for the manual sliding table detects the elevator 130 being in the entry/exit position (POS4), the electronic lock of the loading/unloading door 116 is unlocked (S205), and the storage object W is manually taken out of the entry/exit preparation chamber C. Specifically, the loading/unloading door 116 is opened, the manual sliding table 141 is pulled out of the entry/exit preparation chamber C, and the storage object W is taken out. After that, the manual sliding table 141 is pushed back into the entry/exit preparation chamber C, and the loading/unloading door 116 is closed, whereupon the loading/unloading door 116 is locked by the electromagnetic locking device 117. With the rack presence sensor S2 detecting the absence of the storage rack, the removal of the storage object W is complete.

Upon completion of the removal of the storage object W (S206), the dry air supply mode is switched from the third dry air supply mode (Mode 3) to the fourth dry air supply mode (Mode 4) so that dry purge air having the dew point D1 is supplied into the first anteroom C1 (S207).

After a predetermined time has passed after the switching of the dry air supply mode, i.e., after the interior of the first anteroom C1 has been purged with the dry purge air having the dew point D1, the dry air supply mode is switched from the fourth dry air supply mode (Mode 4) to the fifth dry air supply mode (Mode 5), so that the air tank 185 starts to be filled with dry purge air having the dew point D1 (S208). After that, the elevator 130 is moved downward by the drive unit 121 from the entry/exit position (POS4) to the standby position (POS3) (S209).

When the air tank 185 is filled with dry purge air having the dew point D1 (S210), the dry air supply mode is switched from the fifth dry air supply mode (Mode 5) to the first dry air supply mode (Mode 1) (S211), so that the low-temperature storage system 100 assumes the standby state (S212).

While one embodiment of the present invention has been described in detail, the present invention is not limited to the embodiment described above and may be carried out with various design changes without departing from the scope of the present invention set forth in the claims.

For example, while the storage objects are transferred in the up and down direction in the embodiment described above, the direction of movement is not limited to the specific example and may for example be horizontal. The entry/exit preparation chamber need not necessarily be provided to the upper wall of the low-temperature storage chamber as described in the embodiment and may be located wherever suited in accordance with the transfer direction of the storage objects. To minimize leakage of cool air from the low-temperature storage chamber, it is preferable to provide the entry/exit preparation chamber to the upper wall of the low-temperature storage chamber.

The entry/exit operation described in the embodiment above is not necessarily an essential procedure; the timing of switching the dry air supply mode, or of the movement of the elevator, for example, may be changed as appropriate.

The storage objects in the above embodiment are described as storage racks that each hold a plurality of tubes, but may be the tubes themselves. The storage objects are not limited to tubes or racks and may take any other forms. The contents in the tubes are not limited to samples for drug development such as living cells and may be anything that needs to be stored under low temperature.

The low-temperature storage chamber may be cooled by any method; the low temperature may be maintained in the chamber using liquid nitrogen, electricity, or other cooling means such as carbon dioxide or other gases.

What is claimed is:

1. A low-temperature storage system comprising:
    a low-temperature storage chamber storing a storage object at a low temperature; and a loading/unloading mechanism for loading and unloading the storage object into and out of the low-temperature storage chamber,
    the loading/unloading mechanism including an entry/exit preparation chamber attached to the low-temperature storage chamber and divided from an external environment and the low-temperature storage chamber,
    the entry/exit preparation chamber including a first anteroom having a first interior space controlled to maintain a lower dew point D1 than that of the external environment, and a second anteroom disposed between the first anteroom and the low-temperature storage chamber and having a second interior space controlled to maintain a dew point D2 that is between the dew point D1 in the first anteroom and a dew point D0 in the low-temperature storage chamber,
    the system further comprising a first gas supply line that supplies dry purge air having the dew point D1 to the first anteroom, a second gas supply line that supplies first dry air having the dew point D1 to the first anteroom, a third gas supply line that supplies second dry air having the dew point D2 to the second anteroom, and a single dry air generator for the first to third gas supply lines.

2. The low-temperature storage system according to claim 1, wherein the entry/exit preparation chamber has the first anteroom located outside the low-temperature storage chamber and the second anteroom located inside the low-temperature storage chamber.

3. The low-temperature storage system according to claim 1, wherein the second anteroom is provided with a refrigeration fin for moisture in an atmosphere inside the second anteroom to form frost thereon.

4. The low-temperature storage system according to claim 1, wherein the first gas supply line includes an air tank that temporarily stores the dry purge air supplied from the dry air generator.

5. The low-temperature storage system according to claim 1, wherein the third gas supply line includes a cooler that cools the first dry air supplied from the dry air generator to generate the second dry air, the cooling unit being disposed inside the low-temperature storage chamber.

6. The low-temperature storage system according to claim 1, wherein the loading/unloading mechanism includes an elevator, a first anteroom shutter, and a second anteroom shutter, the elevator being configured to be movable back and forth along an axis,
the first anteroom shutter being configured to be movable back and forth along the axis in coordination with a movement of the elevator and able to close a passage opening, which connects the first anteroom and the second anteroom in communication with each other, from inside the first anteroom,
the second anteroom shutter being configured to be movable back and forth along the axis in coordination with the movement of the elevator and able to close the passage opening from inside the second anteroom.

7. The low-temperature storage system according to claim 6, wherein the first anteroom shutter is provided with a first constant force spring that pulls the elevator and the first anteroom shutter toward each other, the second anteroom communicating with the low-temperature storage chamber through an entry/exit opening, and having an entry/exit shutter capable of opening and closing the entry/exit opening from inside the low-temperature storage chamber,
the entry/exit shutter being provided with a second constant force spring that pulls the elevator and the entry/exit shutter toward each other.

* * * * *